Patented Oct. 13, 1925.

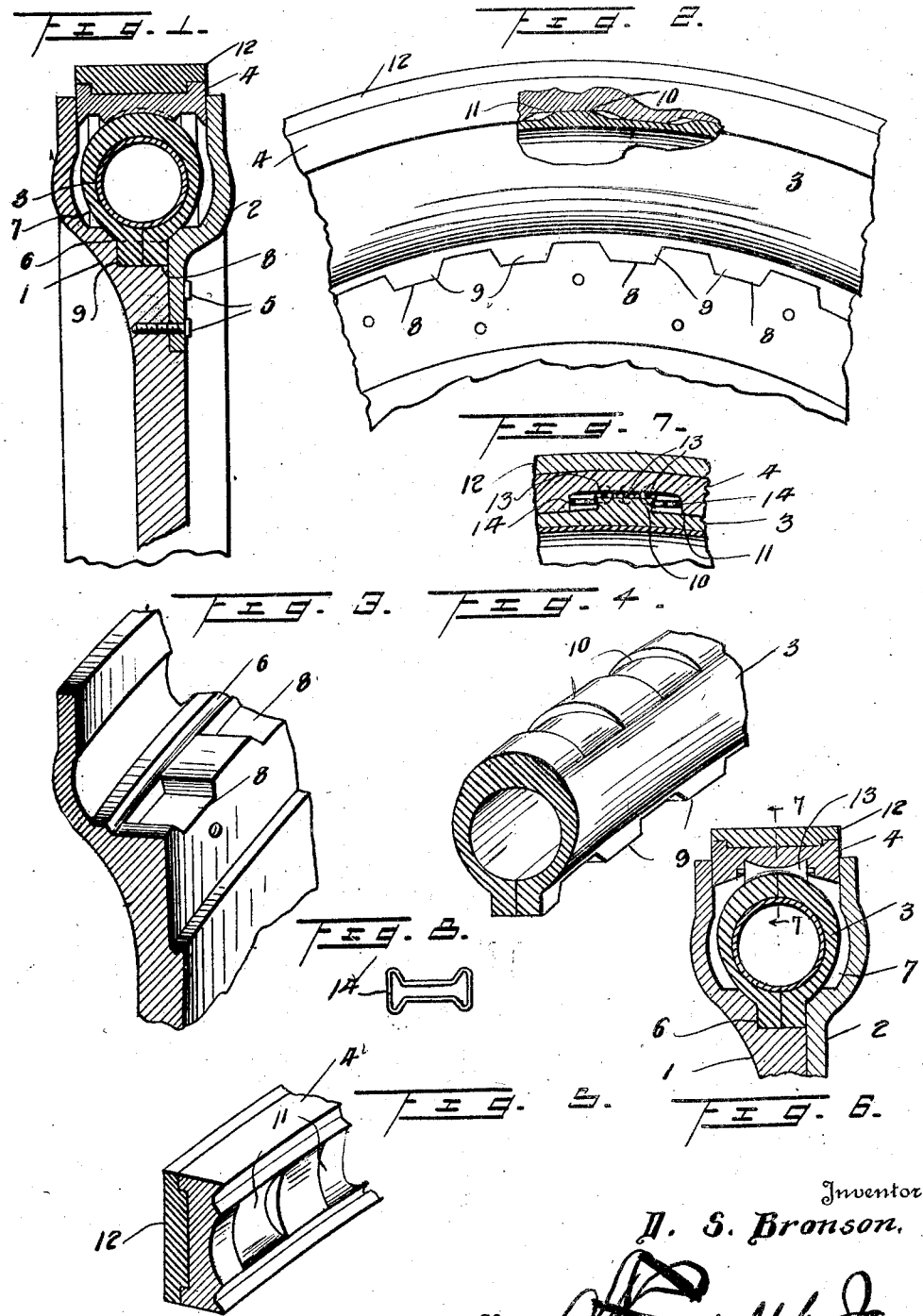

1,557,413

UNITED STATES PATENT OFFICE.

DEWEY S. BRONSON, OF SANFORD, FLORIDA.

YIELDABLE-TREAD WHEEL.

Application filed June 30, 1923. Serial No. 648,716.

*To all whom it may concern:*

Be it known that I, DEWEY S. BRONSON, a citizen of the United States, residing at Sanford, in the county of Seminole and State of Florida, have invented certain new and useful Improvements in Yieldable-Tread Wheels; and I do hereby declare the following to be a full, clear, and exact description of the invention, such as will enable others skilled in the art to which it appertains to make and use the same.

The invention has relation to wheels for automobiles and motor vehicles generally which embody a yieldable tread to compensate for shock and vibration, whereby to minimize the wear and tear on the vehicle and adjunctive parts and to materially add to the comfort of the person occupying the vehicle.

The invention has for its object to provide a wheel of the character aforesaid which possesses all the advantages of a pneumatic tire, but which is free from the objectionable features of puncture, blowout and rim cut.

A further object of the invention is the provision of a wheel having a solid or non-puncturable tire and a pneumatic cushion between said tire and the rim of the wheel, said cushion being housed whereby to protect it from injury, there being a positive connection between the cushion and the tire and rim whereby to prevent circumferential movement or creeping of the tire which would be disadvantageous in a wheel utilized as a driver for propelling the vehicle.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a transverse sectional view of the outer portion of a wheel embodying the invention, Figure 2 is a side view of a portion of the wheel, the confining ring being omitted, Figure 3 is a detail perspective view of a portion of the main ring, the tire, the pneumatic cushion and the confining ring being omitted, Figure 4 is a detail perspective view of a portion of the pneumatic cushion, Figure 5 is a detail perspective view of a portion of the tire, Figure 6 is a detail sectional view of a modification, Figure 7 is a detail sectional view on the line 7—7 of Figure 6, and Figure 8 is a detail view of a centering spring.

Corresponding and like parts are referred to in the following description and designated in the several views of the drawings by like reference characters.

The invention is applicable to wheels of the artillery type or to those having disk centers. The invention is restricted to the outer portion of the wheel and the same comprises a main ring 1 and a confining ring 2, the outer portions of these rings being offset and spaced apart to receive the pneumatic cushion 3 and a solid tire 4. The main ring 1 is rabbeted in a side to receive the inner portion of the ring 2, which is made secure by screws 5 or like fastening means. 6 is a channel or groove formed in the main ring 1 and having for the other of its side walls a portion of confining ring 2 and communicating with space 7 formed between the outer offset portions of said rings. Said channel or groove 6 receives the inner edge portions of a pneumatic cushion 3, said edges being clamped between the inner walls of the rings 1 and 2 forming the sides of said groove or channel 6. The bottom of the channel or groove 6 is formed at regular intervals with depressions 8 which are adapted to receive corresponding projections 9 upon the inner side of the pneumatic cushion 3, whereby circumferential movement of the latter is prevented. The pneumatic cushion 3 is provided upon its outer side with projections 10 which enter depressions 11 formed in the inner side of the tire 4. In this manner, circumferential creeping of the tire is prevented.

The tire 4 preferably consists of a metal band which is covered upon its outer side by a layer of rubber 12 or other suitable material. The inner side of the tire 4 is transversely curved to conform to the curvature of the pneumatic cushion 3. The tire 4 is slidably mounted between the spaced offset portions of the rings so as to move with the changing load pressure.

The pneumatic cushion 3 is constructed in substantially the same manner as the casing or shoe of a pneumatic tire and includes an inner tube which receives the air which inflates the cushion. The space 7 formed between the outer spaced offset portions of the rings 1 and 2 is sufficiently large to allow for compression of the pneumatic cushion when sustaining the load, thereby allowing for neutralization of shock and vibration with the result that the wheel possesses all the advantages of a pneumatic tire while being free of the objections incident to puncture, blowout and rim cut.

As shown most clearly in Figure 2, the projections 10 and the depressions 11 are of such relative lengths as to admit of the tire 4 having a limited circumferential movement. In Figures 6, 7, and 8 is shown a modified form designed to reduce the friction between the moving surfaces, and to that end rollers 13, shown in Figures 6 and 7 are utilized, said rollers being carried by the tire. To centralize said parts 10 and 11 springs 14, shown in Figures 7 and 8 are located at the ends of the projections 10 and between said projections and the ends of the depressions 11.

What is claimed is:

1. In a yieldable tread wheel, the rim of the wheel provided with an offset portion forming one wall of a recess, a ring removable and replaceable on said wheel and forming the other wall of the recess, said wheel being also formed with a channel interiorly of and communicating with said recess and having depressions in its bottom, an annular cushion inserted and removed laterally from said wheel when the ring aforesaid is removed and engaging said recess when in position, and a rib, and integral projections on said cushion to engage said channel and depressions respectively.

2. In a yieldable tread wheel, a cushion and a tire mounted on the cushion, there being corresponding projections and depressions upon adjacent sides of the cushion and tire of such relative lengths as to admit of a limited play, and centering springs between the ends of the projections and depressions.

In testimony whereof I affix my signature.

DEWEY S. BRONSON.